(12) United States Patent
Strubbe et al.

(10) Patent No.: US 6,681,004 B2
(45) Date of Patent: Jan. 20, 2004

(54) TELEPHONE MEMORY AID

(75) Inventors: Hugo J. Strubbe, Yorktown Heights, NY (US); Larry J. Eshelman, Ossining, NY (US); Srinivas Gutta, Buchanan, NY (US); John Milanski, Boulder, CO (US); James A. Hoekema, Newburgh, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 141 days.

(21) Appl. No.: 09/814,885

(22) Filed: Mar. 22, 2001

(65) Prior Publication Data

US 2002/0136378 A1 Sep. 26, 2002

(51) Int. Cl.$^7$ .......................... H04M 7/14; H04M 1/56; H04M 15/06
(52) U.S. Cl. .................. 379/142.06; 379/67.1; 379/88.01; 379/88.11; 379/93.23; 379/142.17
(58) Field of Search .................. 379/93.17, 93.23, 379/142.01, 142.04, 142.06, 142.15, 142.17, 373.04, 374.02, 67.1, 68, 80, 82, 88.01, 88.11, 88.19, 88.2, 88.21

(56) References Cited

U.S. PATENT DOCUMENTS

| | | | |
|---|---|---|---|
| 5,241,586 A | * 8/1993 | Wilson et al. | 379/88 |
| 5,265,145 A | 11/1993 | Lim | 379/88 |
| 5,524,140 A | * 6/1996 | Klausner et al. | 379/88.11 |
| 5,546,447 A | * 8/1996 | Skarbo et al. | 379/142 |
| 5,651,055 A | * 7/1997 | Argade | 379/88.01 |
| 5,812,645 A | 9/1998 | Onosaka | 379/93.23 |
| 5,907,604 A | * 5/1999 | Hsu | 379/142.06 |
| 5,982,866 A | 11/1999 | Kowalski | 379/127 |
| 5,999,611 A | 12/1999 | Tatchell et al. | 379/211 |
| 6,362,838 B1 | * 3/2002 | Szlam et al. | 345/762 |
| 6,442,263 B1 | * 8/2002 | Beaton et al. | 379/142.04 |

FOREIGN PATENT DOCUMENTS

| | | | |
|---|---|---|---|
| EP | 0930584 | 7/1999 | ............ G06T/15/10 |
| GB | 2279203 | 6/1993 | ............ H04M/1/57 |

* cited by examiner

Primary Examiner—Binh Tieu
(74) Attorney, Agent, or Firm—Gregory L. Thorne

(57) ABSTRACT

The telephone memory aid provides a database to a primary party for storing and retrieving personal information about a secondary party, including summary information related to communication exchanges between the primary and secondary parties. The summary information includes, for example, the date and time of prior telephone calls and the topics discussed. This secondary party information, including the summaries of prior telephone calls, is available for review by the primary party during future phone calls with the secondary party. The telephone memory aid also facilitates entry of information into the database through speech recognition algorithms and through question and answer sessions with the primary and secondary parties.

14 Claims, 3 Drawing Sheets

TELEPHONE MEMORY AID

BACKGROUND OF INVENTION

1. Field of the Invention

The invention relates to a telephone memory aid. More specifically, the invention relates to apparatus for allowing personal information about a secondary party from a variety of sources to be entered into a database and have that information automatically displayed to the primary party user in future telephone calls.

DESCRIPTION OF THE RELATED ART

Telephone systems using caller ID are well known in the art. In these systems information coming from the callers telephone is displayed on the receiver telephone. Examples are shown in U.S. Pat. Nos. 5,907604 and 5,982,866. UK patent 2,279,203 discloses an enhanced calling party identifying apparatus that focuses on how to screen calls in an expanded caller ID. A calling party identifying apparatus is electrically connected to an exchange system. The calling party identifying apparatus can display the calling number and the registered name of the calling phone set or the like (such as a fax machine). The calling party identifying apparatus includes a receiver, a microprocessor, a memory, an LCD, a key pad, a plurality of lights, and a speaker. The memory has a database installed therein including a plurality of potential callers' information each of which includes a specific caller's name, the calling number of the caller, the preference degree thereof, and the preferred hours for the caller to call. The calling party identifying apparatus is allowed to display the caller's name on the LCD instead of displaying the registered name of the calling device. When any call comes in, the identification apparatus will check with the database and display the caller's name, the calling number thereof, and the preference degree thereof The patent is focused on how to screen calls in an expanded caller ID system.

SUMMARY OF THE INVENTION

The present invention is a telephone memory aid that is focused on how to capture information during a telephone call and allow entry of information by the user or other party into a database that may be used in future calls. In future calls, the telephone memory aid would allow the user to call or be called by a desired second party and see all of the stored personal information related to the second party. This might include name, date of last call, topics that were discussed in the last telephone call, names of family members, vacation plans, hobbies, and similar such information. The purpose is to improve the conversation flow and communications between the parties of the telephone call.

The apparatus to accomplish the invention is as follows. The telephone memory aid has a first telephone unit of a primary party, a second telephone unit of a secondary party which communicates with the first telephone unit and a database for storing personal information about the secondary party. The telephone memory aid also has a microprocessor communicating with the database for retrieving the personal information of the secondary party in response to a connection of the first and second telephone units. The primary party has a means for reviewing the personal information of the secondary party which is obtained from the database by the microprocessor. An information entry system allows both the primary and secondary parties to enter information about the secondary party into the database during the phone calling process with the secondary party. This secondary party information is available to the primary party on the means for reviewing during future phone calls with the secondary party. Information may also be entered into the database through speech recognition algorithms in the microprocessor and through question and answer sessions with the primary and secondary parties.

DETAILED DESCRIPTION OF THE INVENTION

Figure 1:
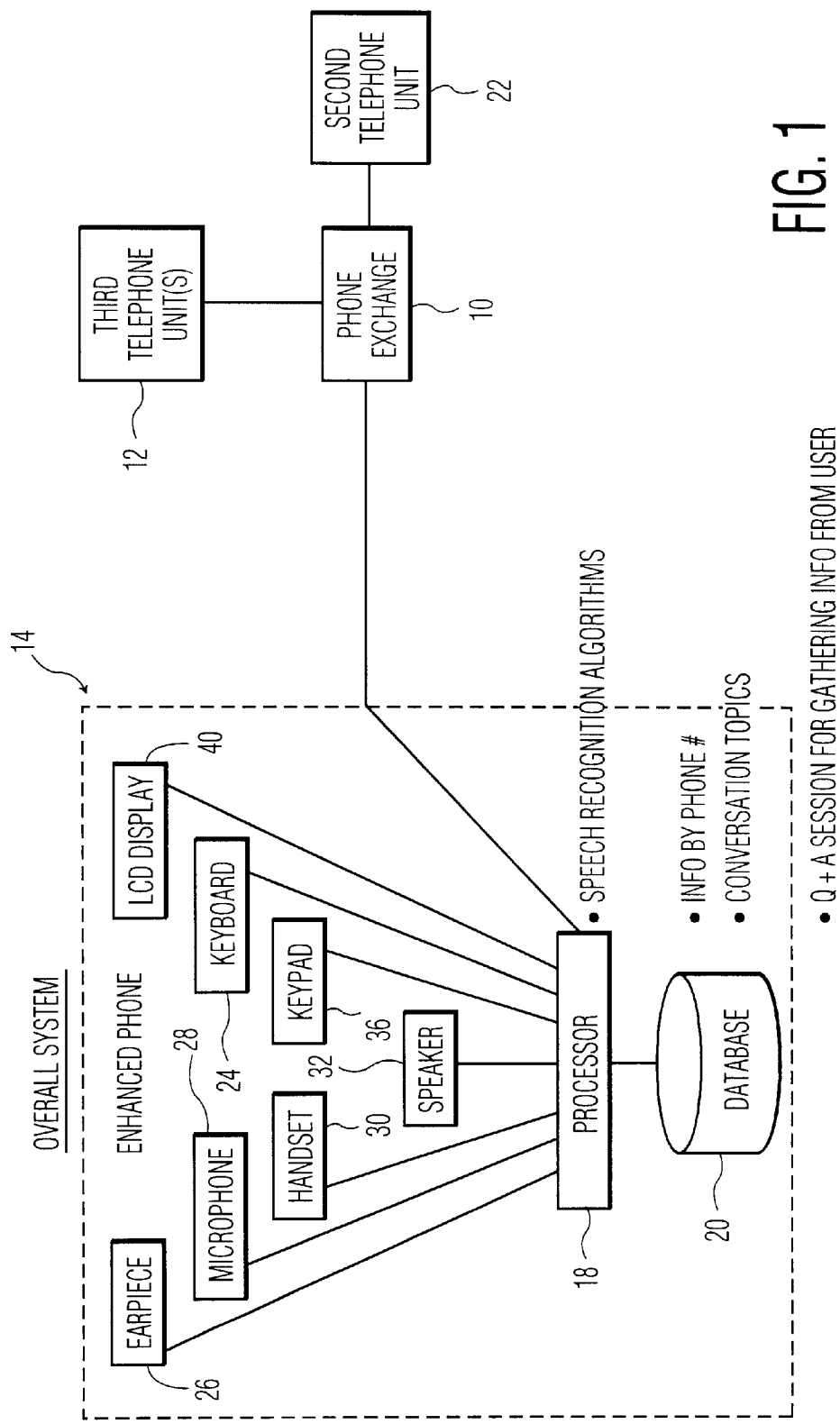
FIG. 1 shows a schematic drawing of the overall system for the telephone memory aid.

FIG. 1 shows a block diagram of the overall system for the telephone memory aid. Element 10 represents a connection to a phone exchange which includes caller ID service. For purposes of disclosure an enhanced telephone 14 connected to phone exchange 10 will be the first telephone unit used by the primary party who is the user of the memory aid system. Enhanced telephone 14 contains a microprocessor 18 which performs all applications for enhanced telephone 14. This includes speech recognition algorithms. Microprocessor 18 is connected to an internal database 20 that maintains personal information which has been entered for a list of secondary callers who may call in from a second telephone unit 22 connected to the enhanced telephone exchange system 10. For example, the relevant information about the secondary party could be the names of his family members, his hobbies, his vacation plans, date of last call, content of the last call or future conversation topics. The purpose of maintaining the personal information about the secondary caller is to help the primary party improve conversation flow and communication with the secondary party during a phone call. Third telephone units 23 may also be connected to the phone exchange 10.

There are several means for entering information into database 20. Keyboard 24 may be used by the primary party or other parties to enter information about the secondary party into the microprocessor 18 which then enters the information into database 20. Internal database 20 may also receive information from a question and answer session algorithm in microprocessor 18 which gathers information from the primary party caller or the secondary party caller about the secondary party caller. The question and answer algorithm would be used in conjunction with a speech recognition algorithm system in microprocessor 18 Microprocessor 18 communicates with earpiece 26, a microphone 28, a handset 30, a speaker 32, a keypad 36, a keyboard 24, and an LCD display 40. These devices are all input/output devices to microprocessor 18 Handset 30 is used by the primary party for speaking and listening in enhanced telephone system 14. Keypad 36 is used for dialing the secondary party caller with the second telephone unit. LCD display 40 is used by the primary party upon initiation of a telephone call to display personal information about secondary party. If the primary party receives a phone call from the secondary party, LCD display 40 displays personal information about the secondary party. Earpiece 26 is used to receive personal information of the secondary party in place of a LCD display 40. Microphone 28 is used by the primary party to a provide information to microprocessor 18 through the speech recognition algorithm. This information is then entered information into database 20.

Figure 2A:
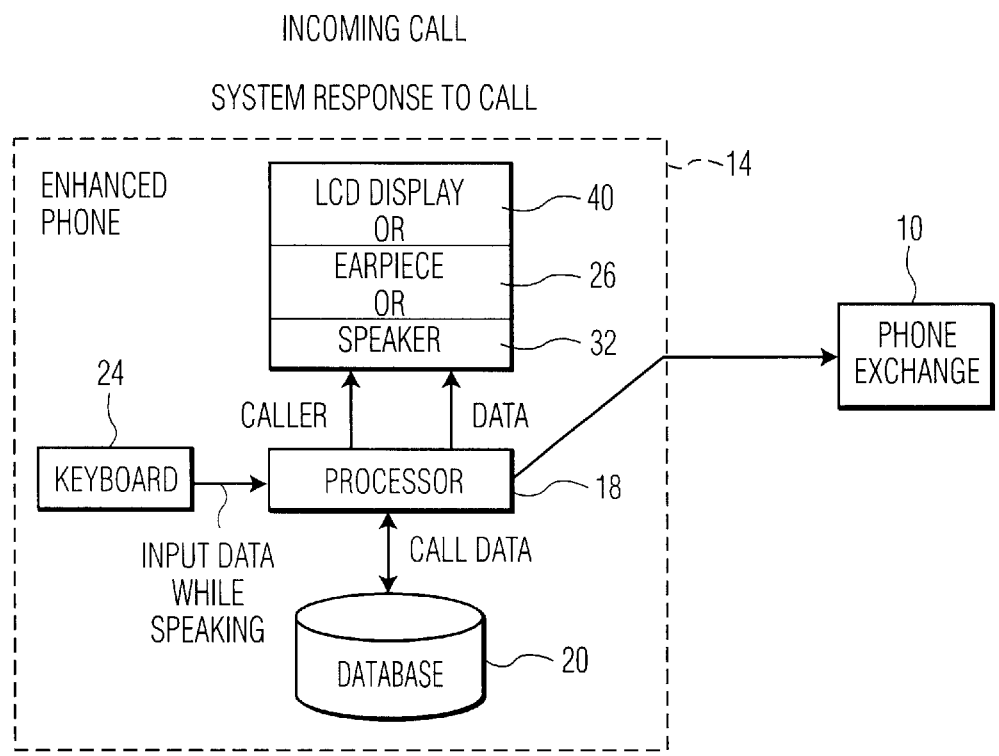
FIG. 2 shows a detailed schematic drawing of the telephone memory aid system when a call is received by the primary party from the secondary party caller.
Figure 2B:
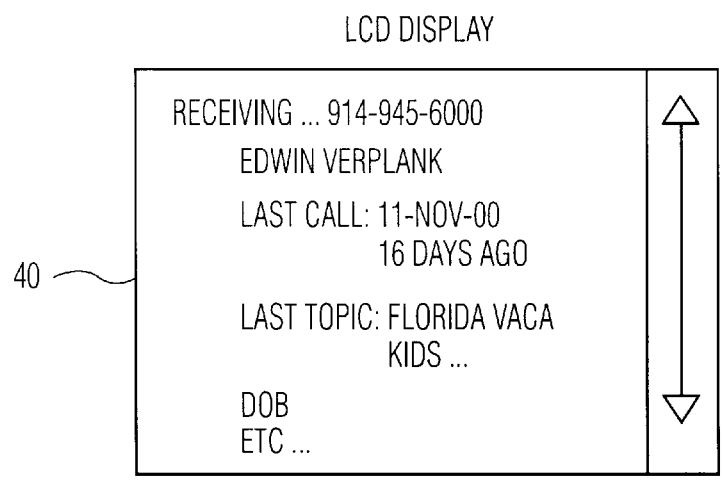

FIG. 2a shows a detailed schematic drawing of the telephone memory aid system when a call (via caller ID) is received by the primary party from the secondary party caller. In FIG. 2a telephone exchange 10 provides the phone number of the secondary party calling from the second telephone unit 22 to enhanced phone 14. Microprocessor 18 which retrieves personal data about the secondary party from the database 20 and provides it to LCD display 40 for the primary party to review. LCD display 40 shown in FIG. 2b displays information about the secondary party such as his name, the date of the last call, the topic that was discussed in the last telephone call, birthday, the names of his family members, his hobbies, his vacation plans, or any other information stored in database 20 about the secondary party. The display may also give the primary party an opportunity to accept or reject the phone call. The primary party could also receive the same information displayed on LCD 40 through earpiece 26 or speaker 44. Keyboard 24 also allows the primary party to enter or update information about the secondary party into microprocessor 18 to be stored in database 20 while the telephone conversation is occurring. Information can also be inputted via a voice dialog (Q&A session between telephone and the primary or secondary party). As speech recognition and language understanding systems become more reliable, information may also be entered into database 20 through the use of the speech recognition algorithm to monitor the conversation of the primary or secondary caller and record its highlights as information.

Figure 3A:
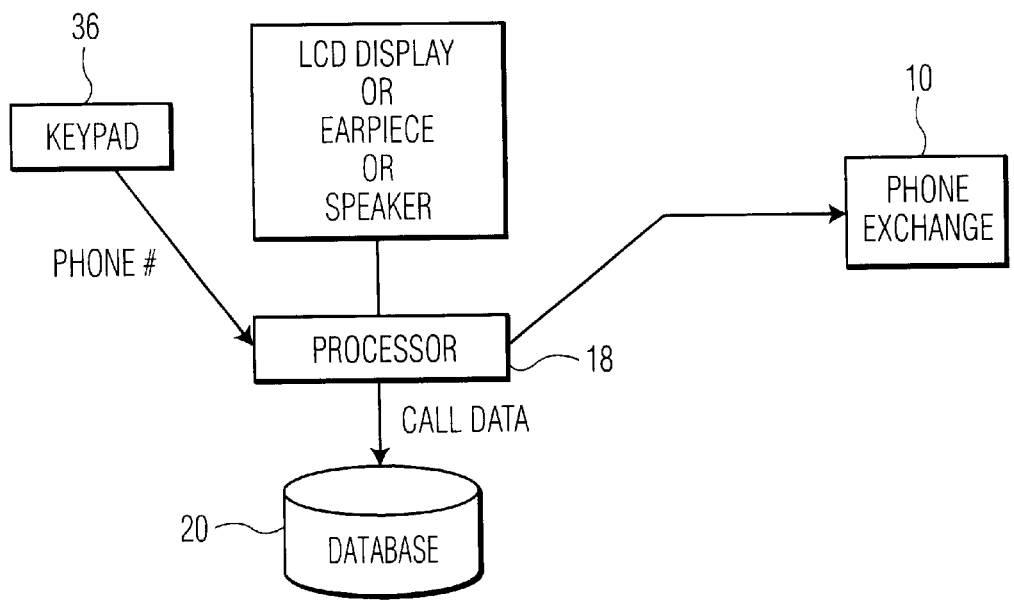
FIG. 3 shows a detailed schematic drawing of the telephone memory aid system when a call is placed by the primary party to the secondary party.
Figure 3B:
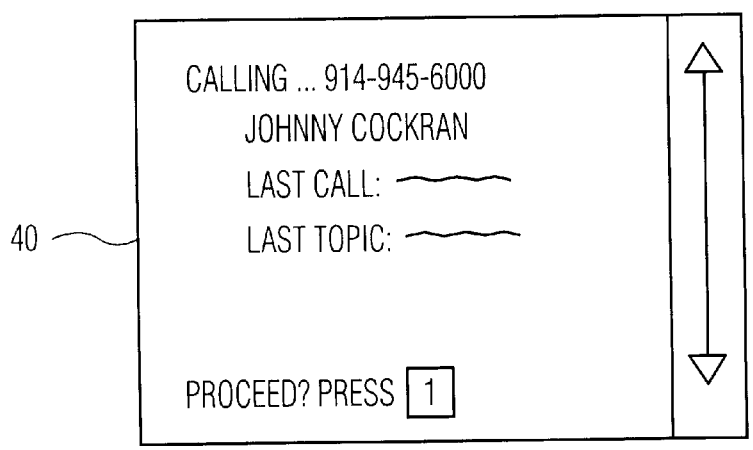

FIG. 3a shows a detailed schematic drawing of the telephone memory aid system when a call is placed by the primary party to the secondary party. The call is initiated by the primary party who enters the phone number in to keypad 36. The phone number goes to microprocessor 18 which retrieves data related to the phone number and displays it on LCD display 40. FIG. 3b shows the information that may be retrieved from database 20 for display on LCD display 40. This is the same information as described with relation to FIG. 2. For example, it may show the telephone number of the secondary party who is being called as well the name of the secondary party. It may also display information such as the last call that was made to the secondary party, the last topic that was discussed. The display may also give the primary party an opportunity to proceed or not proceed with the phone call. Information may also be displayed or entered into database 20, by keyboard 24, or from a question-and-answer session with the primary or secondary party, or through the use of the speech recognition algorithm to monitor the conversation of the primary or secondary caller and record highlight information.

It is also within the scope of the invention for the information about the secondary party in database 20 to be transferred to third telephone 23 whose user may be anticipating a telephone call with the secondary party.

Applicant's inventive idea is really focused on how to capture information during a telephone call for storage in database 20 so it may be used in fixture calls. As the technology develops, the system will increasingly rely on speech understanding and processing to capture key information for the conversation, categorize up, store it, and redisplay it.

While the preferred embodiments of the invention have been shown and described, numerous variations and alternative embodiments will occur to those skilled in the art. Accordingly, it is intended that the invention be limited only in terms of the appended claims.

I claim:

1. A telephone memory aid comprising:
    a database that is accessible by a primary party for storing and retrieving personal information about a secondary party,
    a review system, operably coupled to the database, that is configured to provide the personal information of the secondary party to the primary party in response to a communication between a first telephone unit of the primary party and a second telephone unit of the secondary party, and
    an information entry system that is configured to facilitate entry of summary information pertaining to communication exchanges between the primary and secondary parties during the communication of the first and second telephone units as additional personal information of the secondary party, for presentation to the primary party via the review system during future phone calls with the secondary party.

2. The telephone memory aid of claim 1 in which the review system includes a display.

3. The telephone memory aid of claim 1 in which the review system is configured to selectively provide the personal information as audio.

4. The telephone memory aid of claim 1 in which the information entry system includes a speech recognition system.

5. The telephone memory aid of claim 4 in which the information entry system provides a question and answer session with the primary party.

6. The telephone memory aid of claim 4 in which the information entry system provides a question and answer session with the secondary party to allow the secondary party to enter information into the information entry system.

7. The telephone memory aid of claim 1, wherein the information entry system includes a keyboard.

8. The telephone memory aid of claim 1, wherein the information entry system includes a speech-recognition system.

9. The telephone memory aid of claim 1, wherein the information entry system is configured to selectively facilitate the entry of the summary information by the primary party and by the secondary party.

10. The telephone memory aid of claim 1, wherein the summary information includes at least one of:
    a time of the communication, and
    one or more topics of the communication exchanges.

11. A telephone memory aid comprising,
    a database that is accessible by a primary party for storing and retrieving personal information about a secondary party,
    a review system, operably coupled to the microprocessor, that is configured to provide the personal information of the secondary party to the primary party in response to a communication between a first telephone unit of the primary party and a second telephone unit of the secondary party, and
    an information entry system that is configured to monitor communication exchanges between the primary and secondary parties during the communication between the first and second telephone units and to use a speech recognition algorithm to obtain summary information related to the communication exchanges between the primary and secondary parties, for entry in the database as additional personal information of the secondary party, and for presentation to the primary party during future phone calls with the secondary party via the review system.

12. The telephone memory aid of claim 11 in which the information entry system performs a question and answer algorithm for response by the primary party to enter personal information about the secondary party into the database.

13. The telephone memory aid of claim 11 in which the information entry system performs a question and answer algorithm for response by the secondary party to enter personal information about the secondary party into the database.

14. The telephone memory aid of claim 1 in which the second party information is transferred from the flint phone unit to a third phone unit.

* * * * *